July 24, 1962 — L. L. WATKINS — 3,045,382
FISHING PLUG
Filed May 11, 1961
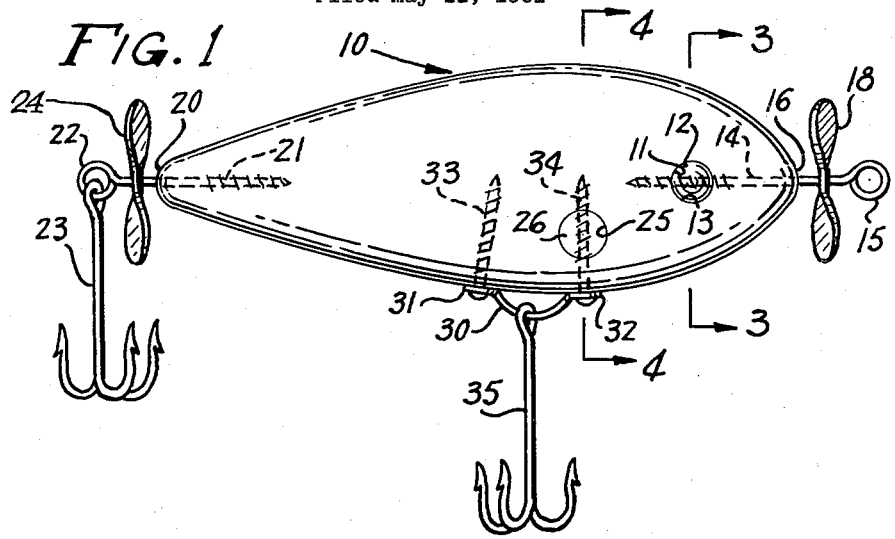
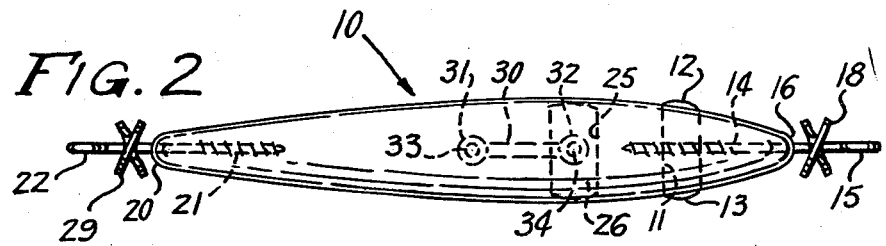
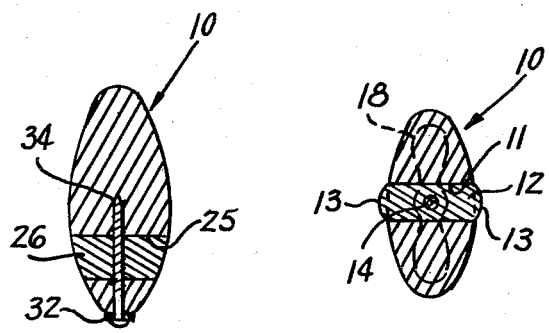
INVENTOR.
LONNIE L. WATKINS
BY
Kimmel & Crowell
ATTORNEYS.

United States Patent Office

3,045,382
Patented July 24, 1962

3,045,382
FISHING PLUG
Lonnie L. Watkins, P.O. Box 1, Garden Valley, Calif.
Filed May 11, 1961, Ser. No. 109,390
1 Claim. (Cl. 43—42.17)

This invention relates to a fishing plug or lure and has as its primary object the provision of an improved plug which is attractive to a fish not only visually but also audibly by reason of means inherent in the plug for creating vibration and audible noises which will serve to attract the fish.

An additional object of the invention is the provision of a plug having a waterproof body and appropriate lead weights, into which weights certain screws are extended, the screws by their extension through the wooden body and the lead plug setting up vibrations which additionally create audible noises.

A further object of the invention is the provision of a plug of this type which may be perfectly counterbalanced for trolling or casting at an appropriate depth.

A further object of the invention is the provision of a device of this character which may be readily decorated in such manner as to be visually attractive to a fish, and which by means of the aforesaid vibrations will create relatively loud, audible noises which may be heard by the human ear, as well as when the plug is under water to be heard by a fish to be attracted thereto.

A further object of the invention is the provision of a device of this character which is sturdy and durable in construction, reliable and efficient in operation, and relatively simple and inexpensive to manufacture and utilize.

Still other objects reside in the combinations of elements, arrangements of parts, and features of construction, all as will be more fully pointed out hereinafter and disclosed in the accompanying drawing wherein:

FIGURE 1 is a side elevational view of one form of plug embodying features of the instant inventive concept, certain concealed parts being indicated in dotted lines;

FIGURE 2 is a top plan view of the device of FIG. 1, certain concealed portions being indicated in dotted lines;

FIGURE 3 is a sectional view taken substantially along the line 3—3 of FIG. 1 as viewed in the direction indicated by the arrows; and FIGURE 4 is a sectional view taken substantially along the line 4—4 of FIG. 1 as viewed in the direction indicated by the arrows.

Similar reference characters refer to similar parts throughout the several views of the drawing.

Having reference now to the drawings in detail, there is generally indicated at 10 a plug body, which is of conventional streamlined or fish-shaped configuration, and which is provided approximately centrally between the top and the bottom and adjacent the forward edge with a transverse bore 11 in which is positioned a lead weight or counterbalance 12. The ends 13 of weight 12 protrude as best shown in FIGS. 2 and 3 and simulate the eyes of the minnow or other fish represented by the plug. They may be appropriately painted, and the body may be decorated as desired.

An elongated screw 14 having a loop 15 in its outer end extends into the nose 16 of the plug and passes through the lead weight 12, the combined penetration through the different materials being effective in setting up a vibration when the screw is moved by means of a propeller 18 which is mounted on the shank of screw 14 in advance of the nose 16.

The tail 20 of the plug is also provided with an elongated screw 21 which extends into the wood of the body, and which has an eye 22 at the outer end thereof to which is attached a gang hook 23, or other hook of conventional design.

A spinner or propeller 29 is mounted on the projecting portion of the shank and also imparts oscillation or vibration of the device, as well as providing an attractive appearance.

A second transverse bore 25 is positioned adjacent the center of gravity of the device, and below the center line longitudinally thereof, and contains a lead plug 26, the ends of which are substantially flush as best shown in FIGS. 2 and 4.

A generally U-shaped hook supporting bracket 30 having flattened end portions 31 and 32 is secured to the underside of the body 10 by means of screws 33 and 34. Screw 33 extends only into the waterproofed wood of the body, whereas screw 34 extends through lead plug 26, the arrangement being such that by its passage through the several materials when vibration is effected in the plug an audible noise is also set forth.

A conventional hook 35 is suspended from the bracket 30 to engage a fish which strikes at the plug or lure.

From the foregoing it will now be seen that there is herein provided an improved fishing plug or lure, which by virtue of the above-described arrangements of parts, particularly including the transversely extending lead plugs and the screws extending thereinto, creates an underwater vibration and a consequent audible noise which proves extremely attractive to fish.

It will also be seen that there is herein provided a plug which accomplishes all the objects of this invention, and others, including many advantages of great practical utility.

As many embodiments may be made of this inventive concept, and as many modifications may be made in the embodiment hereinbefore shown and described, it is to be understood that all matter herein is to be interpreted merely as illustrative, and not in a limiting sense.

I claim:

A fishing plug comprising a generally elongated body portion of water-proof wood having opposite ends defining a nose and tail, a first transversely extending lead weight positioned in said body intermediate the ends thereof and extending through the longitudinal axis of the body, a screw extending through the nose portion into the wood of the body and through said first transversely extending lead weight, a propeller rotatably mounted on said screw and rotatable upon passage of said plug through a body of water, rotation of said propeller imparting a vibration to said screw to produce an audible sound, a second transversely extending lead weight positioned in said body intermediate the ends thereof, said second lead weight disposed below the longitudinal axis of said body and rearwardly of said first lead weight, a hook supporting bracket on the underside of said body having portions defining a pair of spaced openings therethrough, a screw extending through one of the openings in said bracket into the body of said plug, a screw extending through the other opening in said bracket into the body of said plug and through said second lead weight, a screw extending through the tail and into the body of said plug, a spinner mounted for rotation on the screw extending through the tail of said plug, the end portions of said first lead weight extending outwardly from opposite sides of said body and being rounded to simulate eyes, and a hook secured to the end of the screw extending through the tail of said plug.

References Cited in the file of this patent

UNITED STATES PATENTS

| | | |
|---|---|---|
| 870,069 | Wilcox | Nov. 5, 1907 |
| 1,736,403 | Heddon | Nov. 19, 1929 |
| 1,920,935 | Khoenle | Aug. 1, 1933 |
| 2,742,729 | McVay | Apr. 24, 1956 |